United States Patent
Sugimoto et al.

(10) Patent No.: US 7,709,147 B2
(45) Date of Patent: May 4, 2010

(54) STORAGE BATTERY AND PRODUCTION METHOD THEREOF

(75) Inventors: Shuji Sugimoto, Osaka (JP); Fuminori Ozaki, Kanagawa (JP); Takashi Yokoyama, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/914,853

(22) PCT Filed: May 19, 2006

(86) PCT No.: PCT/JP2006/310044

§ 371 (c)(1),
(2), (4) Date: Apr. 29, 2008

(87) PCT Pub. No.: WO2006/123782

PCT Pub. Date: Nov. 23, 2006

(65) Prior Publication Data

US 2009/0104522 A1   Apr. 23, 2009

(30) Foreign Application Priority Data

May 20, 2005   (JP) .............................. 2005-147866

(51) Int. Cl.
*H01M 2/26* (2006.01)
(52) U.S. Cl. ........................................ 429/211; 429/94
(58) Field of Classification Search ........................ None
See application file for complete search history.

(56) References Cited

U.S. PATENT DOCUMENTS

| 7,318,980 B2 * | 1/2008 | Kim ........................... 429/211 |
| 2004/0023107 A1 | 2/2004 | Nakanishi et al. |

FOREIGN PATENT DOCUMENTS

| JP | 2000-058038 |   | 2/2000 |
| JP | 2001-155712 | * | 6/2001 |
| JP | 2002-280057 |   | 9/2002 |
| JP | 2004-071267 |   | 3/2004 |
| JP | 2004-259547 |   | 9/2004 |
| JP | 2005-071677 |   | 3/2005 |
| JP | 2005-100949 |   | 4/2005 |

* cited by examiner

*Primary Examiner*—John S Maples
(74) *Attorney, Agent, or Firm*—McDermott Will & Emery LLP

(57) ABSTRACT

A storage battery includes: a bottomed metal case (10) accommodating an electrolyte and a collector (7) having a flat plate connected to one side of an electrode assembly (5) containing a strip-shaped positive electrode plate (1), a strip-shaped negative electrode plate (2), and a separator (6); a sealing plate (11) sealing upside of the bottomed metal case; and a lead terminal (9) electrically connecting the sealing plate to the collector, wherein the collector has at least one projection (13) and the collector and the lead terminal are electrically connected with each other via the projection. This construction eliminates the problem of increased contact resistance between the lead terminal and the collector and realizes a storage battery having high current discharging performance in which the contact resistance is reduced.

9 Claims, 6 Drawing Sheets

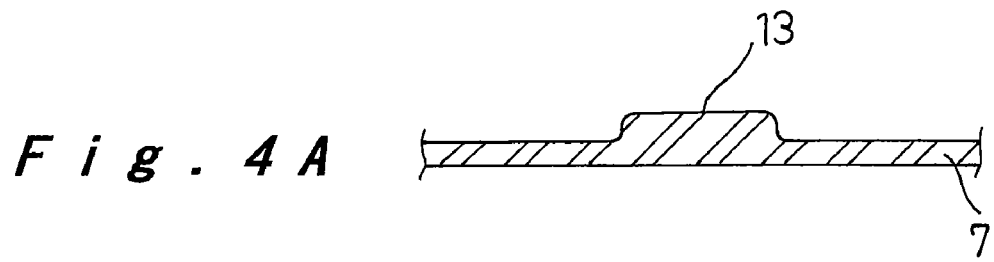
*Fig. 4A*
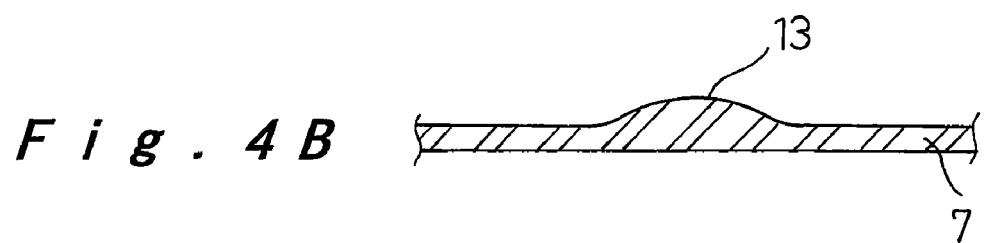
*Fig. 4B*
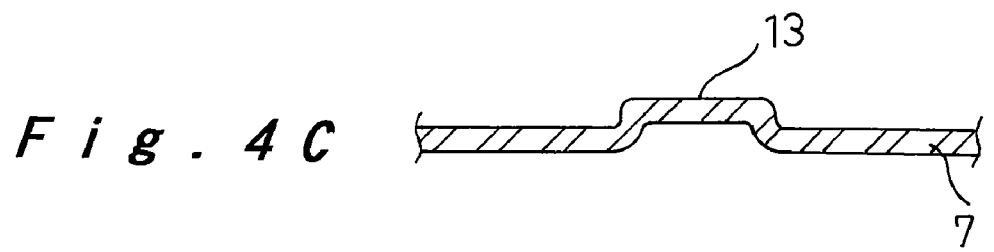
*Fig. 4C*
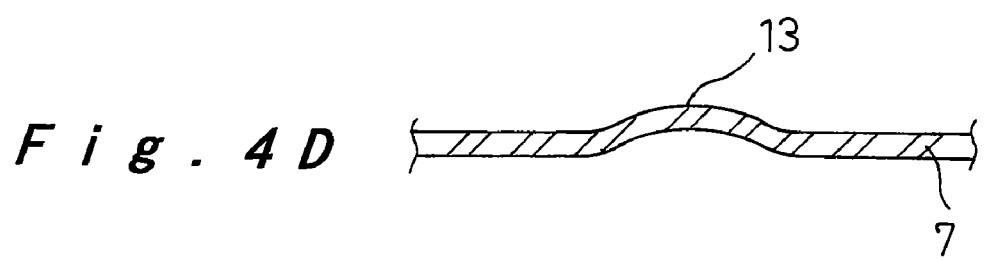
*Fig. 4D*
*Fig. 5*
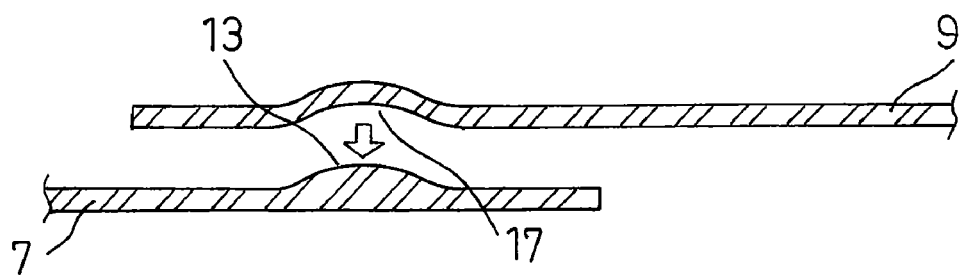

Fig. 6A 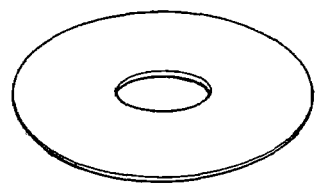 Fig. 6B 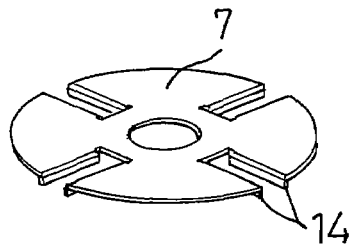

Fig. 6E  Fig. 6G  Fig. 6I
Fig. 6F  Fig. 6H
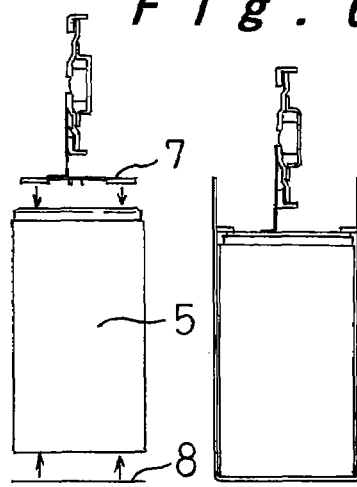 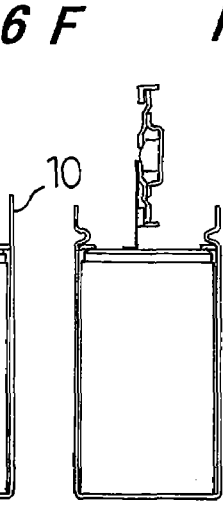 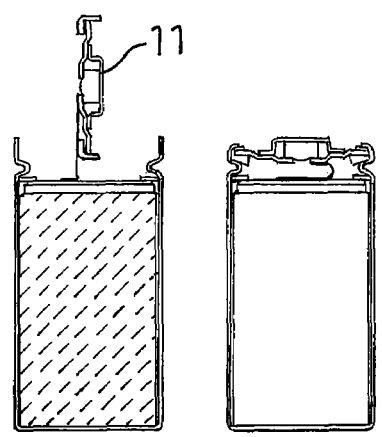

STORAGE BATTERY AND PRODUCTION METHOD THEREOF

RELATED APPLICATIONS

This application is the U.S. National Phase under 35 U.S.C. §371 of International Application No. PCT/JP2006/310044, filed on May 19, 2006, which in turn claims the benefit of Japanese Application No. 2005-147866, filed on May 20, 2005, the disclosures of which Applications are incorporated by reference herein.

TECHNICAL FIELD

The present invention relates to a storage battery having a spiral electrode assembly and a production method thereof. In particular, the present invention relates to an alkaline storage battery for use as a driving power source for vehicles, as well as to a production method thereof.

BACKGROUND ART

Cylindrical alkaline storage batteries, such as nickel cadmium storage batteries and nickel metal-hydride batteries, are highly reliable and easy to maintain and are therefore widely used in cellular phones, laptop computers, and various other applications. In recent years, the development of cylindrical alkaline storage batteries suitable for high current discharging has been demanded for use as a power source in applications such as machine tools, power-assisted bicycles, and electric vehicles.

These cylindrical alkaline storage batteries are formed by spirally winding a strip-shaped stack of a positive electrode plate and a negative electrode plate with a separator interposed therebetween to form an electrode assembly, placing the electrode assembly in a bottomed metal case along with an electrolyte, and sealing the case.

In alkaline storage batteries designed for high current discharging, the positive electrode plate and the negative electrode plate are wound up with their respective upper or lower end portion extending from the upper or lower end of the electrode assembly. The respective edge portions of the positive electrode plate and the negative electrode plate extending from the upper or lower end of the electrode assembly are connected to a substantially circular or rectangular collector at multiple points to ensure high collection efficiency. However, this construction has a drawback that the contact resistance at the lead terminal connecting the sealing body and the collector tend to increase, resulting in a decrease in the battery voltage.

One approach to prevent the lowering of battery voltage caused by the increased contact resistance is to form a projection on each part of the L-shaped lead terminal, one welded to the sealing body and the other welded to the collector, and weld the each part respectively to the sealing body and to the collector (see, for example, Patent Document 1).

[Patent Document 1] Japanese Patent Application Laid-Open No. 2001-155712

DISCLOSURE OF THE INVENTION

Problems to be Solved by the Invention

In the above-described conventional construction, however, the projections formed on the lead terminal undesirably add to the thickness of the lead terminal whereas the collector with no projections formed on it cannot be made thick enough, so that the collector tends to warp when pressure is applied during welding. This causes uneven strength of welds and, as a result, the contact resistance between the lead terminal and the collector is increased.

Accordingly, the present invention has been achieved in view of the foregoing conventional problems, and it is an object thereof to provide a storage battery that exhibits high current discharging performance and in which the contact resistance is significantly reduced.

Means for Solving the Problems

To achieve the foregoing object, a storage battery of the present invention includes: a bottomed metal case accommodating an electrolyte and a collector having a flat plate connected to one side of an electrode assembly containing a strip-shaped positive electrode plate, a strip-shaped negative electrode plate, and a separator; a sealing plate sealing upside of the bottomed metal case; and a lead terminal electrically connecting the sealing plate to the collector, wherein the collector has at least one projection and the collector and the lead terminal are electrically connected to each other via the projection.

This construction eliminates the need to form projections on the lead terminal, so that the thickness of the lead terminal can be decreased. Meanwhile, the thickness of the collector can be increased by forming the projection on the collector. This increases the rigidity of the collector. As a result, the weldability between the lead terminal and the collector can be improved and the contact resistance at the welds can be decreased.

The projection is formed into a semicircular shape. This makes the welding portion between the collector and the lead terminal nearly a point contact, so that the weldability between the collector and the lead terminal can be significantly improved when the components are welded by resistance welding or other techniques that makes use of heat generation and melting of metals caused by a contact resistance and an electric current between metals.

The projection on the collector is formed by extrusion. This leads to several advantages regarding productivity, such as reduction in time required for the welding process, reduction in welding current, and reduction in the pressure required to pressurize the welding electrode. The reduction in the applied pressure can further decrease the warping of the collector and can thus decrease the variation in the strength of welds. Furthermore, the projection can be easily formed on the collector.

A rib-shaped projection piece is preferably formed on the edge of the collector. This increases the rigidity of the collector, so that the warping of the collector during the welding process can be prevented and the variation in the strength of welds between the collector and the lead terminal can be decreased. In addition, the rib-shaped projection piece serves to stabilize the collector during the welding by keeping it from rotating.

The projection, to which the lead terminal is welded, and the rib-shaped projection piece, to which the electrode plate is welded, are formed close to each other on the collector. In this manner, the electrical conductivity between the lead terminal and the electrode plate can be improved.

Furthermore, a recess is formed on the lead terminal to engage with the projection on the collector. This facilitates accurate positioning of the lead terminal relative to the collector for welding and helps prevent misalignment of the lead terminal.

One method for producing the storage battery of the present invention that achieves the aforementioned object includes: the step of forming a projection on a collector; the step of positioning a lead terminal on the projection, welding the lead terminal to the collector via the projection, and connecting one end of the lead terminal to a sealing plate; the step of connecting an electrode assembly to a bottomed metal case, and connecting the collector to the electrode assembly; and the step of injecting the electrolyte in the bottomed metal case, and sealing upside of the bottomed metal case with the sealing plate.

The lower welding electrode is positioned below the projection during the welding of the lead terminal to the projection. Since the lower welding electrode contacts the lower surface of the projection of the collector, the lead terminal can be accurately welded to the projection without deviating the welds.

BRIEF DESCRIPTION OF THE DRAWINGS

FIG. 4A to FIG. 4D show various constructions of the projection formed on the collector, FIG. 4A being a cross-sectional view of a button-shaped projection, FIG. 4B being a cross-sectional view of a semicircular projection, FIG. 4C being a cross-sectional view of a button-shaped projection which is formed by extrusion, and FIG. 4D being a cross-sectional view of a semicircular projection which is formed by extrusion;

FIG. 5 is a cross-sectional view illustrating the manner in which the recess formed on the lead terminal is engaged with the projection on the collector as one embodiment of the present invention;

FIG. 6A to FIG. 6I are illustrative diagrams illustrating each step in an method for producing a storage electrode as one embodiment of the present invention.

BEST MODE FOR CARRYING OUT THE INVENTION

Hereinafter, the preferable embodiment of the present invention will be described with reference to the drawings. The following embodiments and drawings are presented as examples for embodying the present invention and are not intended to limit the scope of the invention in any way.

Figure 1:
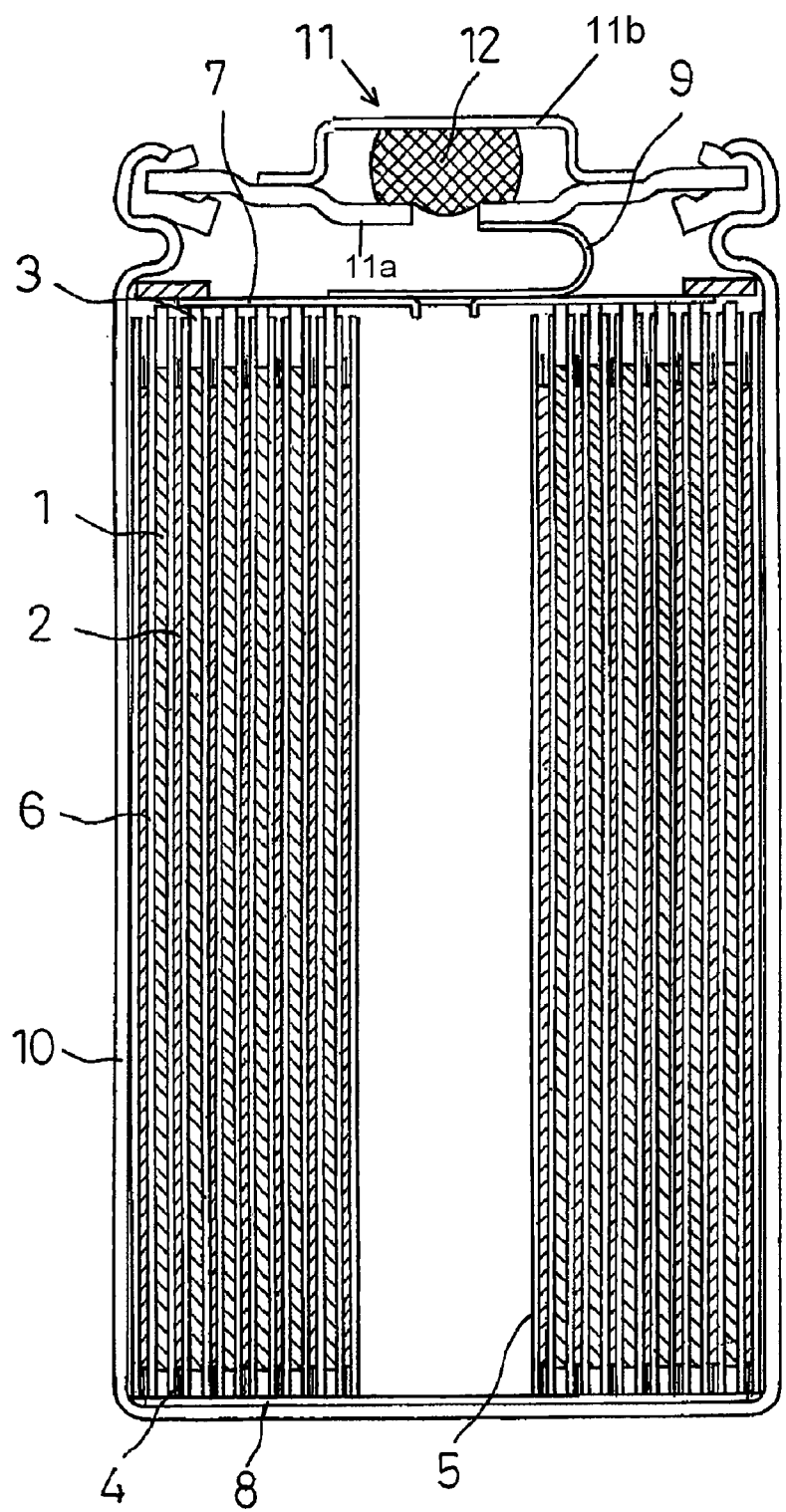
FIG. 1 is a schematic cross-sectional view of a storage battery as one embodiment of the present invention.
Figure 2:
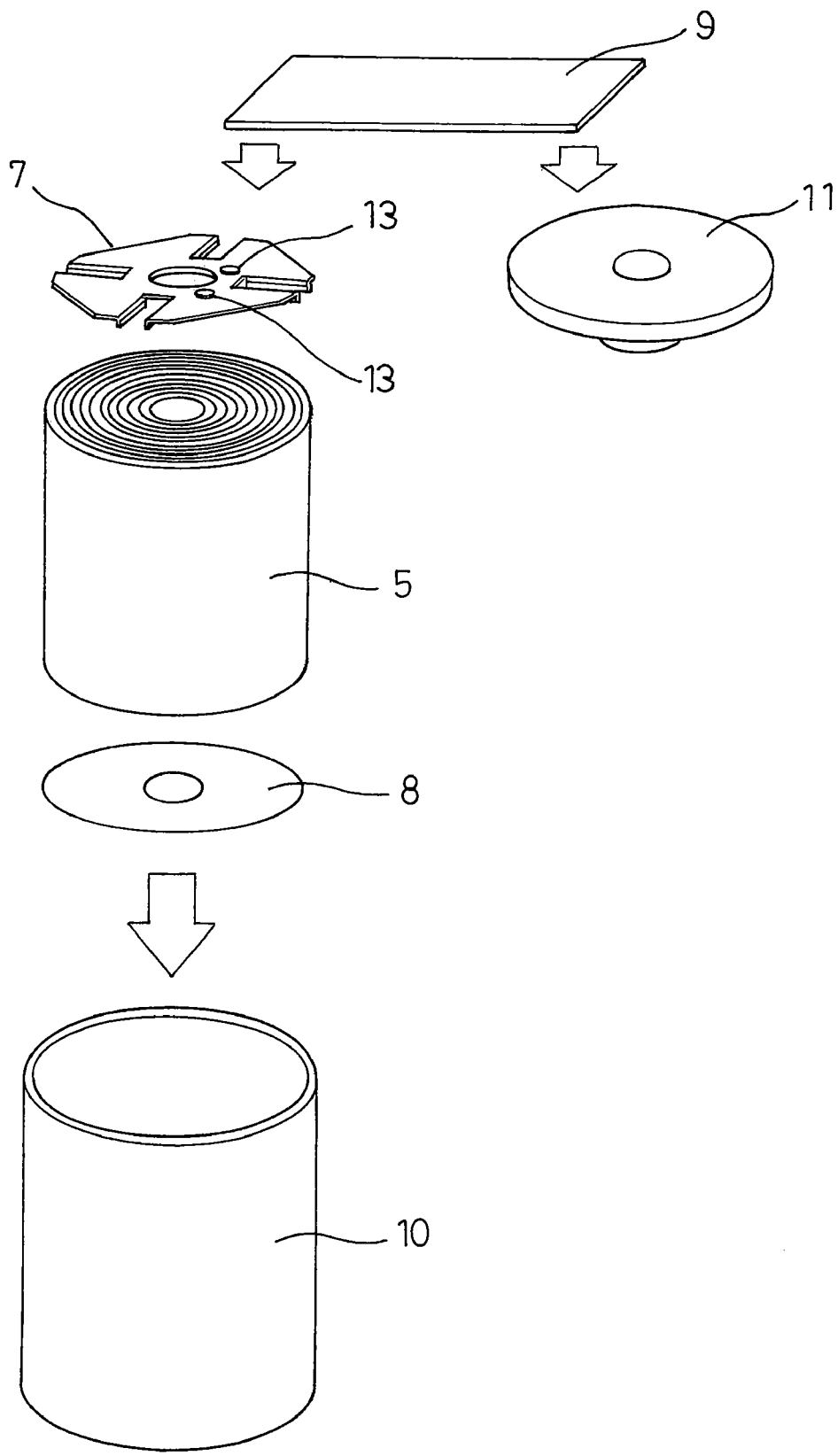
FIG. 2 is an exploded perspective view illustrating the structure of the storage battery of the present invention.

FIG. 1 is a schematic cross-sectional view showing a storage battery as on embodiment of the present invention and FIG. 2 is an exploded perspective view the construction of the storage battery of the present invention. The construction of this storage battery will be described in detail in the following.

A positive electrode plate 1 has its edge portion extending upward and terminates as an exposed positive core material portion 3. A negative electrode plate 2 has its edge portion extending downward and terminates as an exposed negative core material portion 4. The positive and negative electrode plates are spirally wound together with a separator 6 interposed therebetween to form an electrode assembly 5.

The exposed positive core material portion 3 is welded to an upper collector 7 via rib-shaped projection pieces 14. Likewise, the exposed negative core material portion 4 is welded to a lower collector 8.

A lead terminal 9 has one end thereof welded to the upper collector 7 via projections 13 and the other end thereof welded to a sealing plate 11 having a safety vent 12, a lower plate portion 11a and upper plate portion 11b. As such, the sealing plate 11 is an assembly of three components, i.e., the lower plate portion 11a, the safety vent 12 and the upper plate portion 11b.

The electrode assembly 5 is inserted in a battery case (bottomed metal case) 10 and the lower collector 8 is welded to the battery case 10.

Subsequently, a predetermined amount of an alkaline electrolyte is injected into the battery case 10 through a hole formed at the center of the upper collector 7. The lead terminal 9 is then bent into a U-shape so that the opening of the battery case 10 is sealed by the sealing plate 11. This completes a storage battery.

A method for producing the storage battery of one embodiment configured as described above will now be described in detail.

FIG. 6A to FIG. 6I illustrate each step in an method for producing the storage electrode as one embodiment of the present invention.

First, rib-shaped projection pieces 14 as shown in FIG. 6B are formed on a circular flat plate made of a low carbon steel as shown in FIG. 6A to make the upper collector 7.

Figure 6C:
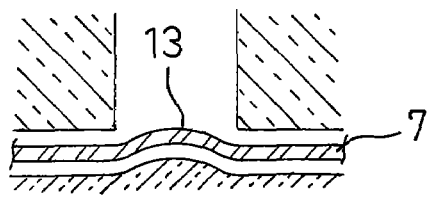

Next, A projection 13 is formed on the upper collector 7 by, for example, extrusion as depicted in FIG. 6C.

Figure 6D:
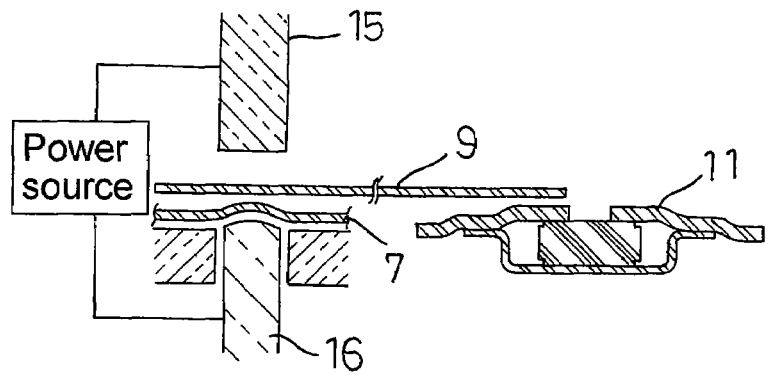

Then, as shown in FIG. 6D, a lower welding electrode 16 is disposed below the projection 13, and the lead terminal 9 is disposed above the projection 13. And, the upper welding electrode 15 is pushed against the upper surface of the projection 13 to weld the lead terminal 9 to the upper collector 7 via the projection 13. One end of the lead terminal 9 is welded to the sealing plate 11.

Figure 7:
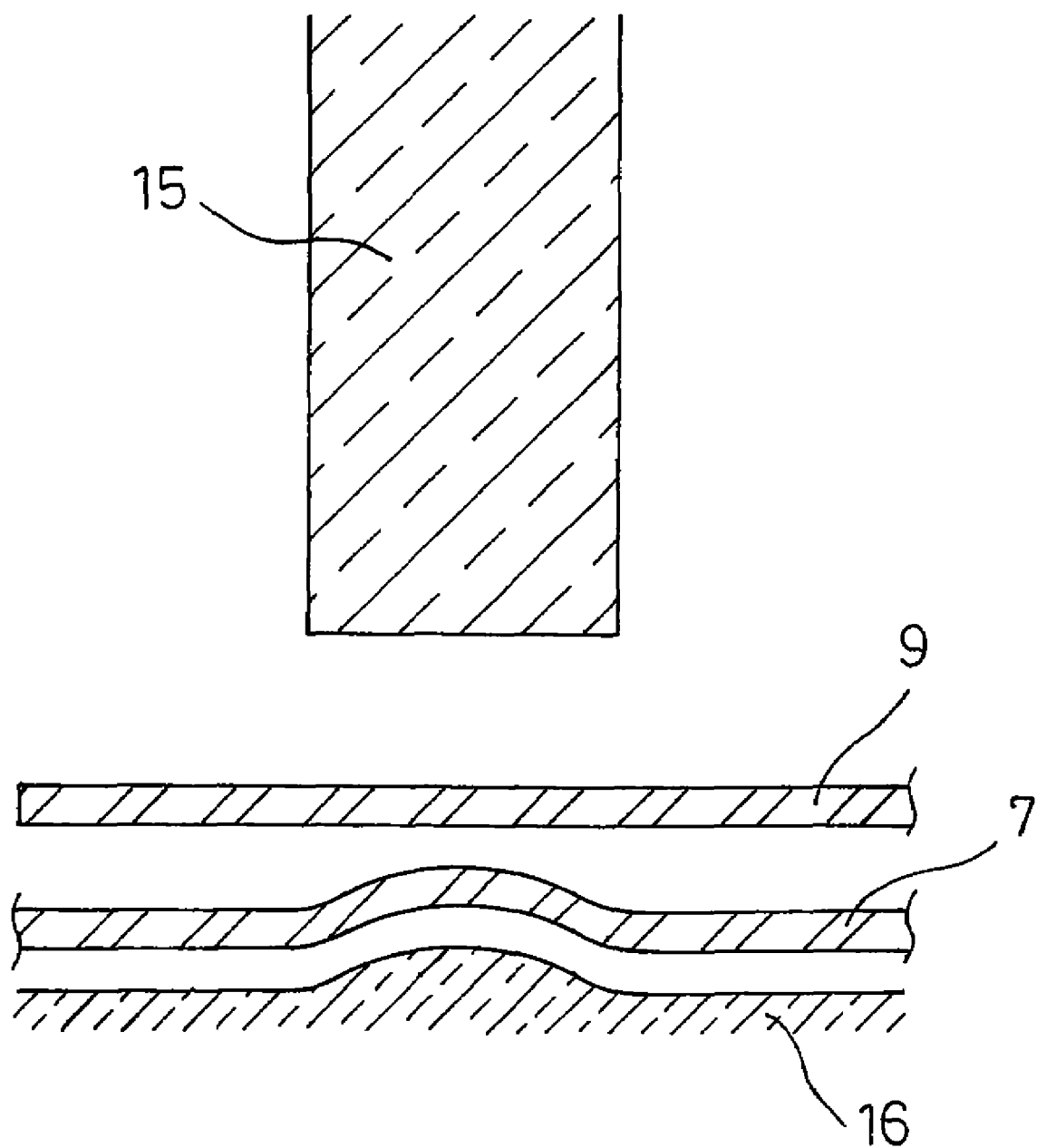
FIG. 7 is a schematic view showing an alternative method for connecting the lead terminal to the collector in the present invention.

Instead of the lower welding electrode shown in FIG. 6D, a lower welding electrode 16 as shown in FIG. 7 may be used.

Next, as shown in FIG. 6E, one side of the electrode assembly 5 is welded to the upper collector 7 and the other side to the lower collector 8.

As shown in FIG. 6F, the electrode assembly 5 is inserted into the battery case 10 and the lower collector 8 is welded to the battery case 10. A groove is then formed near the opening of the battery case 10 as shown in FIG. 6G.

Next, as shown in FIG. 6H, an alkaline electrolyte is injected in the battery case 10. Subsequently, the sealing plate 11 is placed on the groove formed near the opening of the battery case 10 and the opening is sealed by caulking as shown in FIG. 6I.

The lead terminal 9 may be welded to the sealing plate 11 after injection of the alkaline electrolyte.

EXAMPLES

Storage batteries in accordance with the present embodiment, having slightly different constructions, were prepared to serve as Examples 1 to 8, and each battery was compared with a conventional storage battery (Comparative Example 1)

for the connectivity as measured by contact resistance. Details are as described below.

Example 1

An electrode assembly 5 was formed by spirally winding together a 1.0 mm-thick positive electrode plate 1 of sintered nickel, a 0.7 mm-thick negative electrode plate 2 with pasted cadmium and a separator 6, with the upper edge of the positive electrode plate 1 extending upward by 1.5 mm and the lower edge of the negative electrode plate 2 extending downward by 1.5 mm.

A 0.40 mm-thick upper collector 7 with a projection 13 formed on it was welded to the extended edge of the positive electrode plate 1. Likewise, a 0.18 mm-thick lower collector 8 was welded to the extended edge of the negative electrode plate 2.

One end of a lead terminal 9 was welded to the upper collector 7 via the projection 13 and the other end of the lead terminal 9 was welded to a sealing plate 11 to complete an electrode assembly 5, which was then inserted in a battery case 10. The lower collector 8 was welded to the battery case 10.

Subsequently, a predetermined amount of an alkaline electrolyte was injected into the battery case 10 through a hole formed at the center of the upper collector 7. The lead terminal 9 is bent into a U-shape and the opening of the battery case 10 is sealed by the sealing plate 11. This completed a cylindrical alkaline storage battery.

The resulting cylindrical alkaline storage battery has a diameter of 33 mm, a height of 61.5 mm and a nominal capacity of 5000 mAh.

The upper collector 7 and the lead terminal 9 of the cylindrical alkaline storage battery will now be described in detail.

Figure 3A:
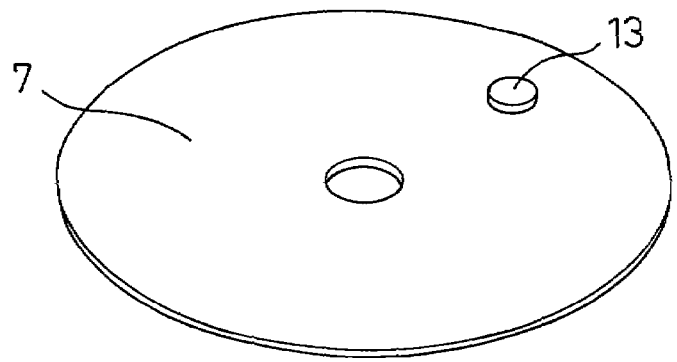
FIG. 3A to FIG. 3C show various constructions of the collector for use in the storage battery, FIG. 3A being a perspective view showing the construction wherein a single projection is provided, FIG. 3B being a perspective view showing the construction wherein a single projection and rib-shaped projection pieces are provided, and FIG. 3C being a perspective view showing the construction wherein two projections and rib-shaped projection pieces are provided.

As shown in FIG. 3A, the collector having a circular flat plate with a single projection 13 formed thereon was used as the upper collector 7 in this instance.

The projection 13 had a button-shaped form in cross-section as shown in FIG. 4A. The upper collector 7 had a thickness of 0.40 mm and was made of a low carbon steel.

The lead terminal 9, being 0.25 mm thick and made of a low carbon steel, was welded to the upper collector 7 to make an alkaline storage battery of Example 1.

The circular flat plate used for the upper collector 7 in Example 1 may be replaced by a rectangular flat plate.

The upper collector 7 may be made of a nickel material and the lead terminal 9 may be formed of an aluminum material in addition to a nickel material.

Nickel and aluminum materials have a good workability and are less likely to generate burrs when used in these components. In addition to this, these materials can readily be bent and facilitate the bending of the lead terminal 9 into a U-shape.

Example 2

An alkaline storage battery of Example 2 was prepared. The battery of Example 2 had the same construction as the battery of Example 1, except that the projection 13 had a semicircular form in cross-section as shown in FIG. 4B.

Example 3

An alkaline storage battery of Example 3 was prepared. The battery of Example 3 had the same construction as the battery of Example 1, except that the projection 13 was formed by extrusion to have a cross-section form as shown in FIG. 4C.

Example 4

An alkaline storage battery of Example 4 was prepared. The battery of Example 4 had the same construction as the battery of Example 2, except that the projection 13 was formed by extrusion to have a cross-section form as shown in FIG. 4D.

Example 5

Figure 3B:
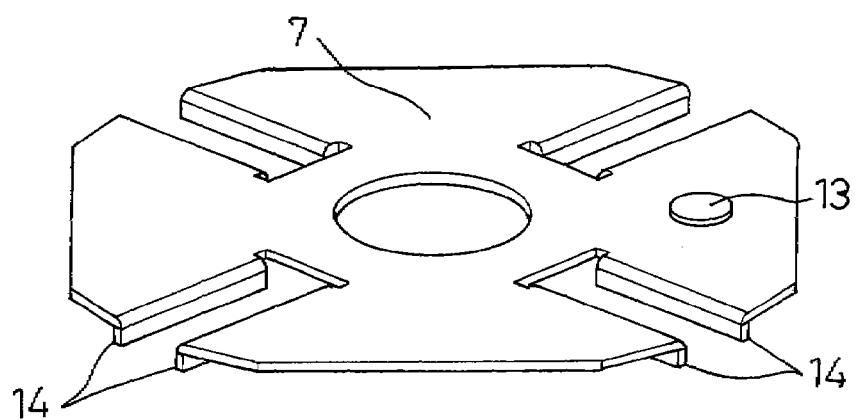

An alkaline storage battery of Example 5 was prepared. The battery of Example 5 had the same construction as the battery of Example 4, except that rib-shaped projection pieces 14 were formed along the edge of the upper collector 7 as shown in FIG. 3B.

Example 6

Figure 3C:
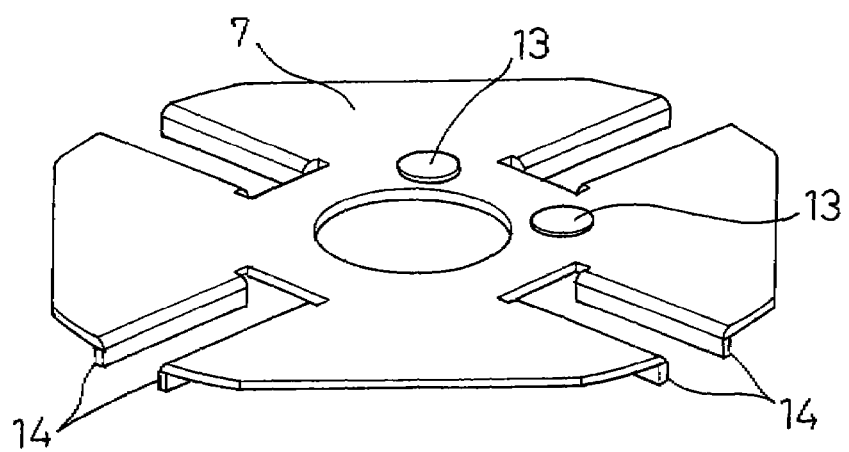

An alkaline storage battery of Example 6 was prepared. The battery of Example 6 had the same construction as the battery of Example 5, except that two projections 13 were formed as shown in FIG. 3C.

A greater number of projections 13 may be formed.

In general, the resistance between two elements decreases as the contact area between the two elements increases. Thus, a larger contact area is suitable for high current discharging. The resistance between the upper collector 7 and the lead terminal 9 can be further decreased by increasing the number of the contacts between them.

Example 7

An alkaline storage battery of Example 7 was prepared. The battery of Example 7 had the same construction as the battery of Example 6, except that the rib-shaped projection pieces 14 and the projections 13 were formed close to one another.

Example 8

An alkaline storage battery of Example 8 was prepared. The battery of Example 8 had the same construction as the battery of Example 7, except that a recess 17 was formed on the lead terminal 9 to engage with the projection 13 on the collector 7 as shown in FIG. 5.

Comparative Example 1

An alkaline storage battery of Comparative Example 1 was prepared. The battery of Comparative Example 1 had the same construction as the battery of Example 1, except that a projection was formed on the 0.40 mm-thick lead terminal, but not on the collector, as is the case with a conventional alkaline storage battery.

Characteristics of each of the alkaline storage batteries as configured described above will be described hereinafter.

The connectivity between the upper collector and the lead terminal as measured by contact resistance was compared between each of the alkaline storage batteries of Examples and the alkaline storage battery of Comparative Example. The results are shown in Table 1.

The contact resistance was measured with the lead terminal bent in a U-shape similarly as on sealing the battery.

The contact resistance of each example was determined as a ratio to the contact resistance of Comparative Example 1 (=1) since it may vary in dependence on the size and other factors of the battery.

TABLE 1

| | Contact resistance ratio relative to Comparative Example 1 (Comparative Example 1 = 1) |
|---|---|
| Example 1 | 0.83 |
| Example 2 | 0.81 |
| Example 3 | 0.82 |
| Example 4 | 0.79 |
| Example 5 | 0.76 |
| Example 6 | 0.74 |
| Example 7 | 0.75 |
| Example 8 | 0.79 |
| Comparative Example 1 | 1 |

As shown in Table 1, the contact resistance is lower in each of Examples 1 to 8, in which the projection 13 is formed on the upper collector 7, than in Comparative Example 1, in which the projection is formed on the lead terminal.

In the construction of Example 1, in which the projection 13 is not necessarily formed on the lead terminal 9, the lead terminal 9 can be formed thinner and the upper collector 7, with the projection 13 formed thereon, can be formed thicker. Accordingly, the rigidity of the upper collector 7 is increased with the projection 13 formed thereon and the problems such as warping of the upper collector 7 during the welding process are eliminated. As a result, the weldability between the lead terminal and the collector is improved, this seems to have caused the decrease in the contact resistance at the welding portion.

In the construction of Example 2, in which the projection 13 has a semicircular form in cross-section, the connecting portion between the projection 13 on the upper collector 7 and the lead terminal 9 become nearly to a point contact, so that the weldability is further improved as compared to the button-shaped projection or the like by welding these components by resistance welding or other techniques that make use of heat generation and melting of metals. This seems to have caused the decrease in the contact resistance at the welding portion.

The construction of Example 3, in which the projection 13 is formed by extrusion, allows the lower welding electrode 16 to be applied on the lower surface of the projection 13. Not only does this increase the efficiency of welding, but it also leads to several advantages regarding productivity, such as reduction in time required for the welding process, reduction in welding current, and reduction in the pressure required to pressurize the upper welding electrode 15. The reduction in the applied pressure further decreases the warpage of the upper collector 7, and thus, decreases the variation in the strength of welds. This seems to have caused the decrease in the contact resistance at the welding portion.

The construction of Example 4, in which the semicircular projection 13 is formed by extrusion, offers two advantageous effects of the improved weldability due to the nearly point contact between the projection 13 on the upper collector 7 and the lead terminal 9 and the improved productivity due to the employment of extrusion.

In the construction of Example 5, the rib-shaped projection pieces 14 formed on the edge of the upper collector 7 serve to increase the rigidity of the upper collector 7, so that the upper collector 7 is kept from warping when the upper welding electrode 15 is pressed against during the welding process. As a result, the variation in the strength of welds between the upper collector 7 and the lead terminal 9 is decreased. This seems to have caused the additional decrease in the contact resistance at the welding portion.

The rib-shaped projection pieces 14 also serve to stabilize the upper collector 7 during the welding by keeping it from rotating. The rib-shaped projection pieces 14 biting toward the electrode assembly 5 appear to also improve the weldability between the collector 7 and the exposed positive core material portion 3, and thus, improve the electrical conductivity between them.

In the construction of Example 6, the two projections 13 serve to further improve the connectivity.

It is expected that this construction can be employed to make a highly reliable alkaline storage battery in which the contact resistance does not increase even when the battery is subjected to vibration during the long-term use.

In the construction of Example 7, it is expected that this construction can provide, in addition to the advantage obtained by Example 6, an advantage of improved electrical conductivity between the lead terminal 9 and the electrode assembly 5 since the rib-shaped projection pieces 14 on the upper collector 7, to which the exposed positive core material portion 3 is welded, and the projections 13 on the upper collector 7, to which the lead terminal 9 is welded, are formed close to one another.

In the construction of Example 8, the recess 17 formed on the lead terminal 9 to engage with the projection 13 on the upper collector 7 facilitates accurate positioning of the lead terminal 9 relative to the upper collector 7 for welding and helps prevent misalignment of the lead terminal 9.

The reason that the construction of Comparative Example 1 exhibits a higher contact resistance than each of the constructions of Examples is that the upper collector has a lower rigidity than the lead terminal that has the projection formed on it. It is generally considered that two elements, one with a projection and the other without, are welded together with high weldability when the one with the projection has a higher rigidity than the other without the projection. It appears that in Comparative Example 1, the lower rigidity of the upper collector than the lead terminal has led to the higher contact resistance than each of the constructions of Examples.

The upper collector 7 and the lead terminal 9 may have varying thicknesses in dependence on the size and other factors of the battery.

Although the upper collector 7 and the lead terminal 9 used in each of Examples 1 to 8 were 0.40 mm thick and 0.25 mm thick, respectively, the same effects were obtained for a 0.25 mm-thick upper collector 7 having rib-shaped projection pieces 14 since the rib-shaped projection pieces 14 serve to increase the rigidity of the collector 7.

Although the upper collector and the lead terminal used in Comparative Example 1 were each 0.40 mm thick, decreasing the thickness of the lead terminal to 0.25 mm decreased its rigidity, resulting in a further increase in the contact resistance.

Next, the high current discharging performance was compared among the cylindrical alkaline storage batteries of Example 1, Example 6, and Comparative Example 1.

Specifically, the high current discharge performance was evaluated as follows: Each battery was charged at a charge current of 500 mA for 15 hours in a 20° C. atmosphere. Subsequently, the batteries were discharged at a discharge current of 5 A to an ending voltage of 1.0 V. Again, the batteries were charged under the above-described conditions and then discharged to the same ending voltage at a discharge current of 27 A. The discharge capacity ratio was evaluated for each battery by dividing the discharge capacity during the 27A discharge by the discharge capacity during the 5A discharge.

The high current discharging performances of the tested batteries were as follows: 87.3% for Example 1, 88.0% for Example 6, and 84.7% for Comparative Example 1.

The results indicate that the alkaline storage batteries of Example 1 and Example 6, in which the contact resistance is low due to the improved weldability between the upper collector 7 and the lead terminal 9, each had an improved high current discharging performance as compared to the battery of Comparative Example 1.

INDUSTRIAL APPLICABILITY

As set forth, the storage batteries of the present invention show high current discharging performance since the contact resistance between the lead terminal and the collector is low. The batteries are therefore suitable for use as a power source in applications where high current discharging is required, such as machine tools, power-assisted bicycles and electric vehicles.

The invention claimed is:

1. A storage battery comprising:
    a bottomed metal case accommodating an electrolyte and a collector having a flat plate connected to one side of an electrode assembly containing a strip-shaped positive electrode plate, a strip-shaped negative electrode plate, and a separator;
    a sealing plate sealing at a top end of the bottomed metal case; and
    a lead terminal electrically connecting the sealing plate to the collector, wherein the collector has at least one projection and the collector and the lead terminal are electrically connected to each other via the projection and, wherein the projection engages a recess provided on the lead terminal.

2. The storage battery according to claim 1, wherein the projection is formed into a semicircular shape.

3. The storage battery according to claim 1, wherein the projection is formed by extrusion.

4. The storage battery according to claim 1, wherein a rib-shaped projection piece is formed on an edge of the collector.

5. The storage battery according to claim 4, wherein the rib-shaped projection piece and the projection are formed close to each other.

6. The storage battery of claim 1, wherein the projection has a semicircular cross-section, and wherein the recess is formed in a shape engageable with the projection having the semicircular cross-section.

7. The storage battery of claim 1, wherein the projection has a button like cross-section, and wherein the recess is formed in a shape engageable with the projection having the button like cross-section.

8. The storage battery of claim 1, wherein the projection has a button like cross-section formed by extrusion, and wherein the recess is formed in a shape engageable with the projection having the button like cross-section formed by extrusion.

9. The storage battery of claim 1, wherein the projection has a semicircular cross-section formed by extrusion, and wherein the recess is formed in a shape engageable with the projection having the semicircular cross-section formed by extrusion.

* * * * *